United States Patent [19]

Peterson et al.

[11] Patent Number: 4,578,165

[45] Date of Patent: Mar. 25, 1986

[54] PROCESS FOR SEPARATION OF ZIRCONIUM FROM HAFNIUM

[75] Inventors: Steven H. Peterson, Murrysville; John F. Jackovitz, Monroeville, both of Pa.

[73] Assignee: Westinghouse Electric Corp., Pittsburgh, Pa.

[21] Appl. No.: 544,160

[22] Filed: Oct. 21, 1983

[51] Int. Cl.$^4$ .............................................. B01J 19/12
[52] U.S. Cl. ............................ 204/157.75; 204/157.5
[58] Field of Search ................... 204/157.1 R, 158 R; 210/748

[56] References Cited

U.S. PATENT DOCUMENTS 3,069,232 12/1962 Greenberg et al. .................... 423/81
3,127,236 3/1964 Peters .................................. 423/73
4,389,292 6/1983 Phillips et al. .................. 204/158 R

OTHER PUBLICATIONS

J. H. Schemel, "ASTM Manual on Zirconium and Hafnium", ASTM Special Technical Publication 639, (1977) pp. 3-10, 20, 56-59.

Minkler et al., "The Production of Titanium Zirconium and Hafnium", Metallurgical Treatises, ed. by Tien et al., Metallurgical Society of AIME (1981) pp. 182-185.

Lustman et al., "Metallurgy of Zirconium", McGraw Hill Book Company (1955) pp. 14, 15.

Tipton, "Reactor Handbook, vol. I Materials", Interscience Publishers (1960) pp. 777, 778.

Primary Examiner—Howard S. Williams
Attorney, Agent, or Firm—John J. Prizzi

[57] ABSTRACT

A process for the separation of zirconium values from hafnium values wherein a solution of a zirconium chelate complex and a hafnium chelate complex, each having a common ligand, is irradiated with light, of a wavelength between 300 nm and 700 nm, in the presence of a scavenger, such that one of the metal chelate complexes is excited and reacts with the scavenger to form a reaction product that is separated from the solution while the other of the metal chelate complex remains stable and is retained in the solution.

22 Claims, 1 Drawing Figure

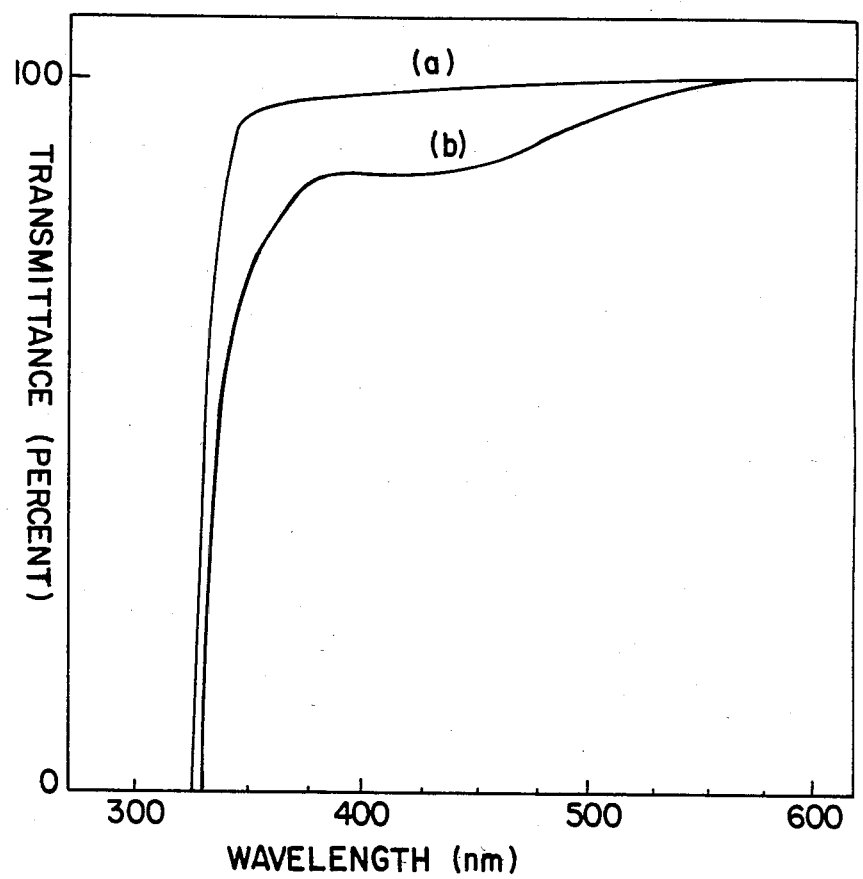

PROCESS FOR SEPARATION OF ZIRCONIUM FROM HAFNIUM

BACKGROUND OF THE INVENTION

The present invention relates to a process for the separation of zirconium values from hafnium values in a mixture containing the same.

The uses of zirconium and high zirconium alloys, such as zircaloy-2, zircaloy-4 and zirconium-2.5 wt.% niobium, in nuclear reactor components are well known. Zirconium and high zirconium alloys being especially useful because of zirconium's low absorption of neutrons. Zirconium is found in ores which also contain hafnium values. The hafnium, which has a moderate absorption capacity for neutrons must be essentially completely removed from mixtures with zirconium, if the zirconium, and its alloys are to be useful in nuclear reactor systems. Nuclear specifications for zirconium and high zirconium alloys generally require that the hafnium impurity content be kept at or below 100 ppm. The hafnium, in its commercially pure state is also useful in specific portions of a nuclear reactor system, where absorption of neutrons is desired. Commercial purity hafnium generally contains about 4 wt.% zirconium. Thus, zirconium and high zirconium alloys are useful as cladding materials, while hafnium is useful in control elements.

The separation of hafnium values from zirconium is one of the more difficult steps in purifying zirconium. These elements are very similar in their physical and chemical properties such as ion size, solubility, reaction chemistry, and the like. Existing commercial processes use solvent extraction of thiocyanate complexes of these metals to produce zirconium having the aforementioned low hafnium impurity level. Problems exist however because of known competing reactions that lead to decomposition of the thiocyanate. The proceeding commercial process is summarized in J. H. Schemel, "ASTM Manual on Zirconium and Hafnium," ASTM Special Technical Publication 639, (1977), of which pages 56 to 59 are hereby incorporated by reference. Other processes for separation of zirconium from hafnium values are discussed in U.S. Pat. No. 3,127,236, which treats a mixture of insoluble compounds such as phosphates or hydroxides with oxalic acid to form oxalato complexes and fractionally precipitates the zirconium and hafnium values from the solution of the complexes, and in U.S. Pat. No. 3,069,232 which uses a saturated solution of ammonium sulfate instead of sulfuric acid to extract hafnium values from the organic phase of a preferrential solvent extraction process for hafnium using a thiocyanate complex.

In a recent patent, U.S. Pat. No. 4,389,292, which is a co-invention of one of the co-inventors herein, and the contents of which are incorporated herein by reference, the $^{91}ZR$ isotopic content of zirconium is altered by raising a zirconium chelate ligand, such as a tetraoxalatozirconate, from a ground state to an activated state in the presence of a scavenger that reacts with the activated ligand, and separating the reacted ligand. Activation of the zirconium compound, i.e. the breaking of a bond in the compound which can either recombine or react with the scavenger, is effected either with the use of heat or the use of light.

We have now discovered that hafnium values can be separated from zirconium values, in a mixture containing both, by irradiating a solution of a mixture of organic complexes of these two elements with light having a wavelength that will excite one of the complexes while the other of the complexes will remain stable, with the excited complex then being separated from the solution while the other complex remains in solution.

BRIEF SUMMARY OF THE INVENTION

The separation of zirconium from hafnium is effected by forming a solution of complexes of the metals, containing a common organic ligand, where one of the complexes is excitable by light while the other complex remains stable, using light having a wavelength between 300 nm to 700 nm, and irradiating the solution with light within that wavelength, in the presence of a scavenger, to excite the one complex and cause reaction thereof with the scavenger, and separation thereof from the solution, while the other complex remains stable in said solution.

BRIEF DESCRIPTION OF THE DRAWINGS

The drawing is a graph illustrating comparative optical transmission spectra of the tetra acetylacetonate complex of zirconium and of the tetra acetylacetonate complex of hafnium in the spectra from 300 nm to 600 nm.

DESCRIPTION OF THE PREFERRED EMBODIMENT

The present process uses the excitation of a zirconium or a hafnium chelate ligand to separate that complex from the other complex present in a solution. As is known, chelates are coordination compounds where a central atom, such as a metal, in the present invention zirconium and hafnium, is joined to a plurality of other molecules (ligands) to form a heterocyclic ring with the central atom as a part of each of the rings.

The zirconium or a hafnium chelate complexes used in the present process are those which provide absorption spectra over a range of wavelengths that will enable excitation of one of the complexes while the other complex remains stable and in solution. A general formula for the chelate ligands usable in the present invention may be expressed as $ML_4$, wherein M is zirconium or hafnium, an L is an organic ligand. The preferred organic ligands are formed from ions derived from beta diketones which are of a formula

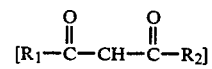

wherein $R_1$ and $R_2$ are alkyl radicals having from 1–4 carbon atoms. Especially useful zirconium and hafnium chelate complexes are zirconium tetra acetylacetonate and hafnium tetra acetylacetonate. The complex of zirconium tetra acetylacetonate may be expressed by the formula:

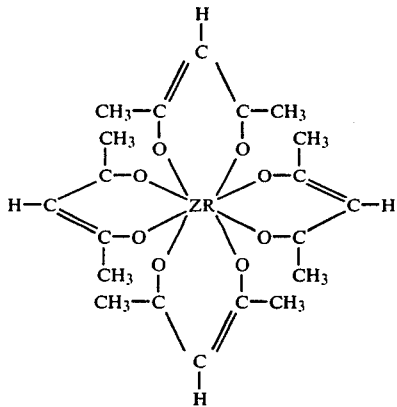

The hafnium tetra acetylacetonate would have the same formula wherein hafnium is substituted for the zirconium atom.

In the present process, the mixture of the zirconium and hafnium chelate ligands are dissolved in a solvent which will provide a medium for irradiation by a light source. The preferred solvent, due to economics, ease with which it may be used, and the fact that it will not absorb light in the wavelengths required for activation of one of the complexes, is water. Other solvents, in particular systems, and for use with particular complexes, for example, methanol, acetone, benzene, toluene, xylene, dimethyl formamide (DMF) or tetra methyl formamide (TMF), and the like, may also be used.

The excitation of one of the complexes, in order to separate the same from the other stable complex, is effected by irradiation, with a light source, of the complexes in solution. The wavelength of the light used for excitation should be within the range of 300–700 nm and preferably about 400 to 700 nm. A particular optimum wavelength within this range would be chosen by determining the absorption spectra of the particular zirconium and hafnium complex and using a wavelength which provides a distinct variance in the absorption characteristics of the complexes.

The separation of the excited complex from the stable complex, which will remain in the solution, is effected by a scavenger, which may also be the solvent used in the formation of the solution of the complexes. For example, in aqueous solutions, the water may also act as the scavenger, forming hydroxides, or other compounds, with the excited complex that will cause formation of a precipitate. Other scavengers, such as oxalates, oxine, ethylene diamine tetraacetic acid (EDTA) or sulfate ions ($SO_4^{--}$), or the like, may be added to the system to enter into photochemical reactions with the excited complex to produce a product with other properties that will enable ready separation from the stable complex which remains in solution. For instance, ligand exchange might be used to produce a product that could be efficiently separated from the solution containing the stable complex by solvent extraction, or a charged complex could be formed that could be removed by ion exchange. The amount of scavenger present should be at least a stoichiometric amount necessary to react with the excited complex.

The irradiation of the solution, with the light of the wavelength specified, is carried out for a period of time sufficient to react the one complex with the scavenger and cause separation thereof from the solution. As an illustration, the accompanying drawing graphically illustrates the optical transmission spectra of zirconium tetra acetylacetonate (a) and hafnium tetra acetylacetonate (b) illustrating the range of wavelength between 350 nm and 550 nm where the hafnium complex can be preferentially excited to a photochemically active state. Both complexes have a strong absorbence starting at about 350 nm, and peaks at 287 nm (not shown) due to the absorption by the acetylacetonate ligand. The hafnium acetylacetonate has a significant absorption brand at longer wavelengths (350–550 nm) while the zirconium acetylacetonate has no significant absorbence in the 350 nm–550 nm range. Thus, it is possible to excite hafnium acetylacetonate in a solution without exciting the zirconium acetylacetonate by using light at a wavelength, within the above range, and most preferably within the range of about 400 to 500 nm.

While the illustration in the drawing is to a chelate ligand of the hafnium and zirconium which will provide excitation and separation of the hafnium complex, it would also be useful to select an organic ligand such that the zirconium complex could be selectively excited and undergo subsequent chemical reaction with a scavenger and separation from a solution that would retain a stable hafnium complex. In such a process, purified zirconium would be recovered as the separated product while the purified hafnium would remain in the solution.

As examples of the selective excitation of complexes according to the present invention, attention is drawn to the following examples.

EXAMPLE I

A saturated aqueous solution of a reagent grade (containing less than 0.1 wt.% zirconium) tetra acetylacetonate complex of hafnium (16.0 grams/liter) was prepared. The freshly prepared solution, at about 24° C., having an intial pH of 4.79, was irradiated with light from an argon ion laser at a wavelength of 488 nm for a period of 2.75 hrs. A precipitate formed which contained hafnium. The pH of the solution was than at 4.63.

A saturated aqueous solution of a reagent grade tetra acetylacetonate complex of zirconium (10.1 grams/liter) was prepared. The freshly prepared solution, at about 24° C., having an initial pH of 4.8, after irradiation with light from the argon ion laser at a wavelength of 488 nm for a period of four hours showed no precipitates. The pH of this solution was then 4.6. After a total of about 6 hours irradiation, only a slight clouding of the solution was present with no precipitate settling.

EXAMPLE II

Example I was repeated except that the wavelength of the light used to irradiate the saturated solutions was 514.5 nm. After four hours irradiation of the hafnium complex-containing solution, during which the pH changed from 4.8 to 4.45, a slight cloudiness was evident. After four hours irradiation of the zirconium complex-containing solution, during which the pH changed from 4.8 to 4.2, no visible precipitate was detected.

EXAMPLE III

Example I was repeated except that the wavelength of the light used to irradiate the saturated solutions was 358 nm. After one hour irradiation of the hafnium complex-containing solution, a definite precipitate formed, and after two hours, the solution would no longer permit passage of the light. After one hour irradiation of the zirconium complex-containing solution, no apparent precipitate formed, while after two, a precipitate formation was evident.

The examples thus illustrate that irradiation and selective excitation of a hafnium complex in an aqueous solution and reaction of the excited complex with the water to form a recoverable precipitate can be effected, while the zirconium complex upon irradiation at the same wavelengths remains stable and in solution in the aqueous medium.

It should be noted, that while a laser light source was used in the proceeding examples, and is preferred, it is not required for the practice of the present invention. Any high intensity light source of the needed wavelength is acceptable.

It should be further noted that while reagent grade complexes were used in the preceding examples, it is presently contemplated that crude zirconium tetrachloride (i.e. containing naturally occurring concentrations of hafnium) would be dissolved in a solvent and reacted with tetra acetylacetonate to form a solution containing zirconium tetra acetylacetonate and hafnium tetra acetylacetonate.

The following reaction is specifically contemplated:

The solution formed containing zirconium and hafnium complexes would then be irradiated in the presence of a scavenger to transform the hafnium complex into a separable compound.

Other embodiments of the invention will be apparent to those skilled in the art from a consideration of this specification or practice of the invention disclosed herein. It is intended that the specification and examples be considered as examplary only, with the true scope and spirit of the invention being indicated by the following claims.

What is claimed is:

1. A process for the separation of zirconium and hafnium values from a mixture thereof comprising:
   forming a solution of complexes of the hafnium and the zirconium, said complexes having a common organic ligand, one of said complexes being excitable by light within the wavelength range of 400–700 nm, while the other of said complexes is stable within said range;
   irradiating said solution with light, having a wavelength within said range, in the presence of a scavenger, to excite said one complex and cause reaction thereof with the scavenger, and separation thereof from said solution, while the other complex remains in said solution.

2. The process for the separation of zirconium and hafnium values from a mixture as defined in claim 1 wherein said separation is effected by precipitation of said excited complex from the solution and removal of said precipitate therefrom.

3. The process for the separation of zirconium and hafnium values from a mixture as defined in claim 1 wherein said common organic ligands is formed from a beta diketones having the formula

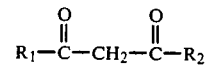

wherein $R_1$ and $R_2$ are lower alkyl radicals having 1–4 carbon atoms.

4. The process for the separation of zirconium and hafnium values from a mixture as defined in claim 3 wherein $R_1$ and $R_2$ are methyl groups.

5. The process for the separation of zirconium and hafnium values from a mixture as defined in claim 1 wherein said solution is an aqueous solution.

6. The process for the separation of zirconium and hafnium values from a mixture as defined in claim 5 wherein the water of said aqueous solution also acts as the scavenger.

7. The process for the separation of zirconium and hafnium values from a mixture as defined in claim 1 wherein said excitable complex is a complex of zirconium and said stable complex is a complex of hafnium.

8. The process according to claim 1 wherein said wavelength of said irradiating light is selected from the range of about 400 to 500 nm.

9. A process for the separation of zirconium values from hafnium values from a mixture thereof comprising:
   preparing a solution which contains a zirconium chelate ligand and a hafnium chelate ligand, the ligand being the same in each complex, and a scavenger which will react with one of said chelate ligands but not with the other, upon excitation by irradiation with light having a wavelength in the range between 400 nm and 700 nm;
   irradiating said solution with light having a wavelength within said range, to excite said one chelate ligand, for a period of time sufficient to cause reaction thereof with said scavenger, to produce a reaction product; and
   separating said reaction product from the solution which retains said other chelate ligand.

10. The process according to claim 9 wherein said wavelength of said irradiating light is selected from the range of 400 to 500 nm.

11. A process for the separation of zirconium and hafnium values from a mixture thereof comprising:
   forming a solution of complexes of the hafnium and the zirconium, said complexes having a common organic ligand, one of said complexes being excitable by light within the wavelength range of 300–700 nm, while the other of said complexes is stable within said range;
   irradiating said solution with light, having a wavelength within said range, in the presence of a scavenger, to excite said one complex and cause reaction thereof with the scavenger, and separation thereof from said solution, while the other complex remains in said solution;
   and the excitable complex is said complex of hafnium and the stable complex is said complex of zirconium.

12. The process for the separation of zirconium and hafnium values from a mixture as defined in claim 11 wherein said separation is effected by precipitation of said excited complex from the solution and removal of said precipitate therefrom.

13. The process for the separation of zirconium and hafnium values from a mixture as defined in claim 11 wherein said common organic ligands is formed from a beta diketones having the formula

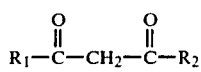

wherein $R_1$ and $R_2$ are lower alkyl radicals having 1–4 carbon atoms.

14. The process for the separation of zirconium and hafnium values from a mixture as defined in claim 13 wherein $R_1$ and $R_2$ are methyl groups.

15. The process for the separation of zirconium and hafnium values from a mixture as defined in claim 11 wherein said solutioh is an aqueous solution.

16. The process for the separation of zirconium and hafnium values from a mixture as defined in claim 15 wherein the water of said aqueous solution also acts as the scavenger.

17. The process for the separation of zirconium and hafnium values from a mixture as defined in claim 11 wherein said excitable complex is a complex of zirconium and said stable complex is a complex of hafnium.

18. The process according to claim 11 wherein said wavelength of said irradiating light is selected from the range of about 400 to 700 nm.

19. The process according to claim 11 wherein said wavelength of said irradiating light is selected from the range of about 350 to 550 nm.

20. A process for the separation of zirconium values from hafnium values from a mixture thereof comprising:

preparing a solution which contains a zirconium chelate ligand and a hafnium chelate ligand, the ligand being the same in each complex, and a scavenger which will react with one of said chelate ligands but not with the other, upon excitation by irradiation with light having a wavelength in the range between 300 nm and 700 nm;

irradiating said solution with light having a wavelength within said range, to excite said hafnium chelate ligand, for a period of time sufficient to cause reaction thereof with said scavenger, to produce a reaction product; and separating said reaction product from the solution which retains said zirconium chelate ligand.

21. The process according to claim 20 wherein said wavelength of said irradiating light is selected from the range of about 400 to 700 nm.

22. The process according to claim 20 wherein said wavelength of said irradiating light is selected from the range of about 400 to 500 nm.

* * * * *